(12) United States Patent
Strasser

(10) Patent No.: US 10,807,473 B2
(45) Date of Patent: Oct. 20, 2020

(54) ON-BOARD NETWORK FOR A MOTOR VEHICLE AND METHOD FOR OPERATING AN ON-BOARD NETWORK FOR A MOTOR VEHICLE

(71) Applicant: AUDI AG, Ingolstadt (DE)

(72) Inventor: Roman Strasser, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 152 days.

(21) Appl. No.: 16/191,749

(22) Filed: Nov. 15, 2018

(65) Prior Publication Data
US 2019/0143823 A1    May 16, 2019

(30) Foreign Application Priority Data
Nov. 16, 2017    (DE) .................... 10 2017 220 487

(51) Int. Cl.
| | | |
|---|---|---|
| *B60L 1/00* | (2006.01) | |
| *B60L 3/04* | (2006.01) | |
| *B60L 15/00* | (2006.01) | |
| *B60L 50/15* | (2019.01) | |

(Continued)

(52) U.S. Cl.
CPC .................. *B60L 1/003* (2013.01); *B60L 1/00* (2013.01); *B60L 3/0007* (2013.01); *B60L 3/04* (2013.01); *B60L 15/007* (2013.01); *B60L 50/15* (2019.02); *B60L 50/50* (2019.02)

(58) Field of Classification Search
CPC .. B60L 1/003; B60L 3/04; B60L 50/50; B60L 15/007; B60L 1/00; B60L 3/0007; B60L 50/15

See application file for complete search history.

(56) References Cited

U.S. PATENT DOCUMENTS

| | | | | |
|---|---|---|---|---|
| 9,472,365 | B1* | 10/2016 | Lopez | .................... H01H 50/12 |
| 2004/0062059 | A1 | 4/2004 | Cheng et al. | |
| 2006/0108954 | A1* | 5/2006 | Sebille | .................... F02N 11/04 |
| | | | | 318/108 |

FOREIGN PATENT DOCUMENTS

| | | |
|---|---|---|
| DE | 102006000796 A1 | 8/2006 |
| DE | 112006003033 T5 | 1/2009 |
| DE | 102010027864 A1 | 12/2011 |

(Continued)

OTHER PUBLICATIONS

German Office Action dated Nov. 6, 2018 of corresponding application No. DE102017220487.7; 3 pgs.

(Continued)

*Primary Examiner* — Jared Fureman
*Assistant Examiner* — Duc M Pham
(74) *Attorney, Agent, or Firm* — Maier & Maier, PLLC

(57) ABSTRACT

An on-board network for a motor vehicle, having at least one energy storage system for the intermediate storage of electrical energy and an electrical power network, which has at least one energy-consuming device that can be operated with electrical energy from the energy storage system and at least one charging device for charging the energy storage system, wherein the energy storage system is electrically connected to the electrical power network by way of at least one contactor. In this case, it is provided that the energy-consuming device is present in a first electrical power sub-network of the electrical power network and the charging device is present in a second electrical power sub-network of the electrical power network.

9 Claims, 1 Drawing Sheet

(51) Int. Cl.
*B60L 3/00* (2019.01)
*B60L 50/50* (2019.01)

(56) References Cited

FOREIGN PATENT DOCUMENTS

| | | |
|---|---|---|
| DE | 102013005439 A1 | 4/2014 |
| DE | 102014014926 A1 | 4/2016 |
| DE | 102016104646 A1 | 9/2016 |
| DE | 102015010536 A1 | 2/2017 |
| DE | 102015217190 A1 | 3/2017 |
| DE | 102016015316 A1 | 7/2017 |
| WO | 2012078721 A2 | 6/2012 |

OTHER PUBLICATIONS

German Office Action dated Nov. 6, 2018 of corresponding application No. DE102017220487.7; 23 pgs.

* cited by examiner

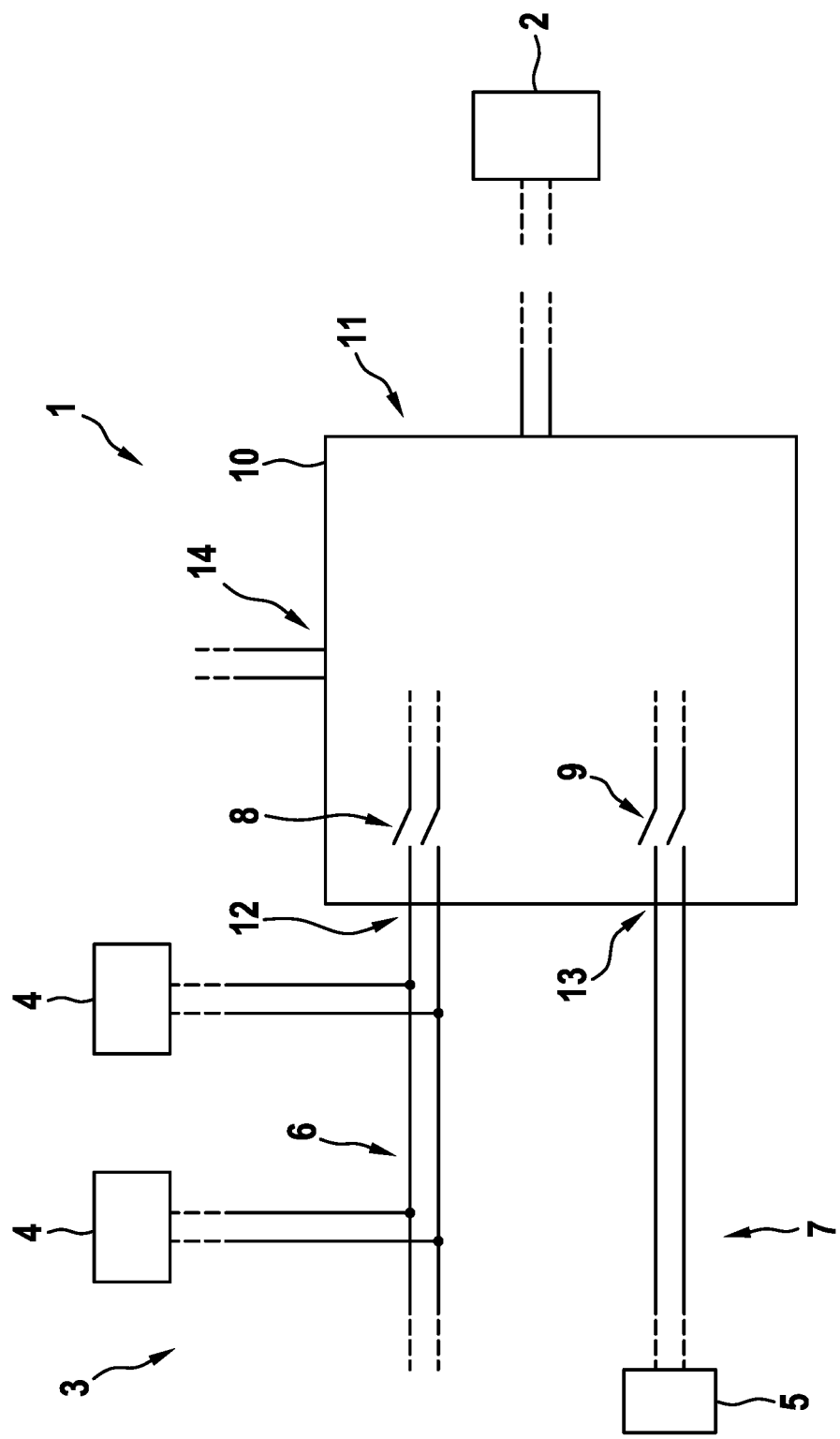

ON-BOARD NETWORK FOR A MOTOR VEHICLE AND METHOD FOR OPERATING AN ON-BOARD NETWORK FOR A MOTOR VEHICLE

FIELD

The invention relates to an on-board network for a motor vehicle, having at least one energy storage system for the intermediate storage of electrical energy and an electrical power network that has at least one energy-consuming device that can be operated with electrical energy from the energy storage system and at least one charging device for charging the energy storage system, wherein the energy storage system is electrically connected to the electrical power network via at least one contactor. The invention further relates to a method for operating an on-board network for a motor vehicle.

BACKGROUND

Known from the prior art is, for example, the publication DE 10 2014 014 926 A1. It relates to an arrangement composed of at least two electric traction energy storage devices, wherein each of the traction energy storage devices comprises a storage module for storing electrical energy, a contactor box connected to the storage module, and a high-voltage distributor, which are integrated in a housing of the traction energy storage device, and, at the housing of each traction energy storage device, a plurality of connectors that are connected to the high-voltage distributor and/or the contactor box are provided, each of which has two electrical contacts.

The connectors comprise high-voltage distributor connectors, which are connected to the high-voltage distributor, and a two-pole connection terminal, for which at least one electrical contact is electrically connected to a pole of the contactor box. In this case, the at least two electric traction energy storage devices can be electrically connected to each other via the connectors in such a way that the storage modules of the traction energy storage device are wired serially through electrical connection of the connection terminals, so that, for the arrangement, a system voltage in the magnitude of the sum of the individual voltages results and the primary and auxiliary assemblies can be supplied with the system voltage by way of the high-voltage distributor connectors.

SUMMARY

The object of the invention is to propose an on-board network for a motor vehicle that, in comparison to known on-board networks, offers advantages, in particular, smaller electrical losses, and, in addition, is characterized by a higher safety.

This is achieved in accordance with the invention with an on-board network for a motor vehicle with the features of claim 1. In this case, it is provided that the energy-consuming device is present in a first electrical power sub-network of the electrical power network, and the charging device is present in a second electrical power sub-network of the electrical power network, wherein the first electrical power sub-network is connected to the energy storage system in a manner that is electrically separated from the second electrical power sub-network, by way of the contactor present as the first contactor, and the second electrical power sub-network is connected to the energy storage system in a manner that is electrically separated from the first electrical power sub-network, by way of a second contactor.

The on-board network is preferably part of the motor vehicle and contains a plurality of electrical components or serves at least for supplying these electrical components with electrical energy. The electrical component may also be referred to as an electric device. The on-board network comprises the energy storage system, by means of which electrical energy can be intermediately stored. In this regard, the energy storage system can be charged with electrical energy. Subsequently, the electrical energy can be taken from the energy storage system for operating at least one of the electrical components.

At least one of the electrical components is present, for example, in the form of the energy-consuming device, which, together with the charging device, which represents the additional electrical component, is arranged in the electrical power network. For reasons of safety, the electrical power network* is electrically connected to the electrical power network via the contactor. By means of the contactor, the electrical power network can be electrically disconnected from the energy storage system or connected to it. In other words, in a first switch position of the contactor, the energy storage system is electrically disconnected from the electrical power network, whereas, in a second switch position of the contactor, the energy storage system is electrically connected to the electrical power network.

It is provided that the energy-consuming device is present in the first electrical power sub-network and the charging device is present in the second electrical power sub-network. This means that the electrical power network, which is a component part of the on-board network, is divided into two separate electrical power sub-networks, namely, the first electrical power sub-network and the second electrical power sub-network. The energy-consuming device is present in the first electrical power sub-network, whereas the charging device is assigned to the second electrical power sub-network. The energy-consuming device may be referred to, for example, as an electrical device or it may be present as such.

Especially preferred, all energy-consuming devices of the electrical power network or of the on-board network are connected to the first electrical power sub-network. In contrast, all devices that serve to charge the energy storage system with electrical energy, that is, at least the charging device, are connected to the second electrical power sub-network. The devices connected to the second electrical power sub-network and consequently also the charging device are preferably provided and designed for charging the energy storage system with externally supplied energy. The externally supplied energy is provided, for example, by means of a stationary energy supply device, such as, for example, a charging station or the like. Obviously, it is also possible to supply electrical energy taken from the energy storage system to an external device. In this case, the charging device preferably has a bidirectional design.

The energy storage system is present especially preferably as a high-voltage battery; that is, at least during an operation of the on-board network as intended, said high-voltage battery has an operating voltage or battery voltage of at least 100 V, at least 200 V, at least 400 V, at least 600 V, or at least 800 V. For reasons of safety, in particular, the energy storage system is electrically connected to the electrical power network by way of the at least one contactor. In this regard, by means of the contactor, the energy storage system can be electrically disconnected from the electrical power network or connected to it.

The energy storage system is electrically disconnected from the electrical power network, for example, provided that the electrical energy stored in said electrical power network is not needed. This may be the case, for example, if the electrical energy requirement of the energy-consuming device can be taken care of in another way, such as, for example, from another energy storage system and/or by means of a generator, or if the motor vehicle is not in operation. Alternatively or additionally, it is provided to electrically disconnect the energy storage system from the electrical power network in the event that the motor vehicle is involved in an accident. In this way, it can be prevented that electrical current is undesirably applied to regions of the motor vehicle where this is not normally the case.

In the case of the embodiment of the energy storage system as a high-voltage energy storage system, the energy-consuming device is also present as a device that consumes high-voltage energy. This means that the energy-consuming device is supplied with electrical energy via the first electrical power sub-network having a voltage that corresponds to the voltage of the energy storage system or corresponds at least nearly to it. The energy-consuming device is present, for example, in the form of an electric machine of a drive device of the motor vehicle and, in this case, the electric machine may also be referred to as a traction engine.

The traction engine serves for driving the motor vehicle and in this regard, therefore, for providing a torque directed at driving the motor vehicle. The electric machine or traction engine preferably has an inverter, which is connected to the first electrical power sub-network. At the input end, therefore, the voltage present at the first electrical power sub-network, that is, consequently, the voltage supplied by the energy storage system, is applied to the inverter. Fundamentally, there can be any number of traction engines.

In the case of just one contactor by way of which the energy storage system is connected to the electrical power network, the charging device is also supplied with electrical current from the energy storage system during operation of the energy-consuming device, such as, for example, during a drive operation of the motor vehicle. Conversely, the energy-consuming device is supplied with electrical energy while the energy storage system is being charged by means of the charging device.

During the operation of the energy-consuming device, however, the charging device is usually not in operation and therefore is not used for charging the energy storage system. Likewise, the energy-consuming device is usually not needed during charging of the energy storage system by means of the charging device, in particular—in the case of the embodiment of the energy-consuming device as a traction engine—because the motor vehicle is usually at a standstill during the charging. Accordingly, electrical losses arise at the respective element that is not needed, that is, either at the energy-consuming device or at the charging device.

For this reason, it is provided that the electrical power network is divided into the first electrical power sub-network and the second electrical power sub-network, with the energy-consuming device being present in the first electrical power sub-network and the charging device being present in the second electrical power sub-network. The two electrical power sub-networks can each be electrically connected separately to the energy storage system, that is, independently of the respective other electrical power sub-network. For this purpose, the first electrical power sub-network is connected by way of the first contactor and the second electrical power sub-network is connected by way of the second contactor to the energy storage system.

Solely for purposes of completeness, it is noted that the first contactor corresponds to the previously already mentioned contactor, by way of which the energy storage system is to be electrically connected to the electrical power network. In addition, it is noted that the electrical power network can have any desired number of electrical power sub-networks, that is, even more than two. Each of the electrical power sub-networks is connected, in a manner that is electrically separated from the other electrical power sub-networks, to the energy storage system via a contactor in each case, so that each of the electrical power sub-networks is optionally electrically connected to the energy storage system or disconnected from it.

For each of the two contactors, that is, both for the first contactor and for the second contactor, what has already been stated for the contactor fundamentally applies. In this regard, both contactors can each be present in a first switching state and in a second switching state, with an electrical connection being severed in the first switching state and being made in the second switching state by way of the respective contactor. With the help of such an embodiment of the on-board network, the energy-consuming device and the charging device can be electrically connected to the energy storage system as needed.

The first contactor and the second contactor can each fundamentally be designed in any way and, in particular, they are single-phase or multiphase. In the former case, the respective contactor serves solely for switching one phase between the energy storage system and the corresponding electrical power sub-network. In a multiphase embodiment, the contactor serves for switching a plurality of phases, in particular all phases. The respective contactor may be present in the form of a switch. For example, the contactor is designed as an electromechanical contactor or as a semiconductor contactor. In the former case, for example, it has at least one solenoid and, in the latter case, it has at least one semiconductor switch.

Preferably, it is provided that the first electrical power sub-network is electrically decoupled from the energy storage system if the energy-consuming device is not being operated, that is, is not in operation. Conversely, the second electrical power sub-network is to be decoupled from the electrical power network if the charging device is not being used for charging the energy storage system. Ultimately, this means that, in all operating states of the motor vehicle or at least in nearly all operating states, fewer electrical components are electrically connected to the energy storage system than is the case for known on-board networks. Accordingly, safety is also markedly improved, in particular in the event that the motor vehicle in involved in an accident.

Another embodiment of the invention provides that the energy-consuming device is present as a traction engine for the motor vehicle, an inverter, an electrically operated air conditioner compressor, or an electric heating element of an interior compartment heating, in particular. Reference has already been made above to the embodiment of the energy-consuming device as a traction engine. Other embodiments can also be realized.

Obviously, it is also possible for a plurality of energy-consuming devices to be electrically connected to the first electrical power sub-network, each of the energy-consuming devices being present as one of the previously mentioned elements. Thus, it is possible, for example, for two energy-consuming devices to be present in the form of electric machines or traction engines, both of which are connected to the first electrical power sub-network. Further advantageously, the energy-consuming device may be present as an air conditioner compressor or as a heating element, each of which is designed as a device that consumes high-voltage energy, that is, has an operating voltage that corresponds to the battery voltage or at least nearly corresponds to it.

Another preferred embodiment of the invention provides that the charging device is connected to a charging connector or to an energy transfer device for wireless transfer of energy. The charging connector is present, for example, in the form of an electric plug-in connector, by way of which a charging cable can be electrically attached and consequently can be electrically connected to the charging device. In this regard, the charging connector serves for making a cabled electrical connection to the external energy supply device, for example. Alternatively, the charging device can be connected to the energy transfer device. It serves for cable-free energy transfer, preferably likewise from the external energy supply device. The energy transfer device is present, for example, in the form of at least one electric coil or the like.

The charging device is preferably connected directly, in particular, without an intervening power converter, to the energy storage system by way of the second contactor. This means that electrical energy is supplied via the charging connector or the energy transfer device at a charging voltage that preferably corresponds to or is even higher than at least the battery voltage of the energy storage system. In this regard, the charging device is present as a high-voltage charging device. An embodiment of this kind makes possible an especially efficient charging of the energy storage system.

In the scope of another embodiment of the invention, it can be provided that a power converter device is connected by way of both the first contactor and the second contactor to the energy storage system or that the power converter device is connected to the energy storage device by way of a battery contactor. The power converter device serves for converting electrical energy supplied by the energy storage system. The power converter device preferably is present in the form of a voltage converter and therefore serves for converting the battery voltage supplied by the energy storage system to an output voltage that differs from it. Preferably, the output voltage is lower than the battery voltage. For example, via the power converter device, a low-voltage electrical power network is connected to the energy storage system. The low-voltage electrical power network has, for example, an operating voltage or rated voltage of at most 48 V, at most 36 V, at most 24 V, or at most 12 V. It is also possible to provide a configuration of the power converter device as an inverter, in particular, a pulse inverter.

It is now provided that the power converter device is connected to the energy storage system by way of both the first contactor and the second contactor. As soon as one of the two contactors is closed, that is, is present in the second switch position, there is an electrical connection between the energy storage system and the power converter device. In this case, the power converter device is connected to the first contactor and the second contactor in such a way that the corresponding electrical power sub-circuit remains electrically decoupled from the energy storage system, provided that the contactor assigned to the respective other electrical power sub-network is closed.

If, therefore, the first contactor is closed and, in contrast, the second contactor is opened, then the first electrical power sub-network, but not the second electrical power sub-network, is electrically connected to the energy storage system. If, conversely, the first contactor is opened and the second contactor is closed, then the first electrical power sub-network is decoupled from the energy storage system and the second electrical power sub-network is electrically connected to it. For this purpose, the power converter device is joined via a corresponding electric switch to the first contactor and the second contactor or is connected to them.

Alternatively, it may be provided that the power converter device is connected to the energy storage system via the battery contactor. This means that, when the battery contactor is in a first switch position, the power converter device is decoupled from the energy storage system, and, when the battery contactor is in a second switch position, it is electrically connected to the energy storage system. In this regard, the battery contactor is preferably designed analogously to the first contactor and the second contactor. The battery contactor may also be referred to as a main contactor.

It may be provided that the battery contactor is electrically connected to the energy storage system in parallel to the first contactor and the second contactor. In an embodiment of this kind, the power converter device, the first electrical power sub-network, and the second electrical power sub-network can each be electrically connected to the energy storage system or decoupled from it independently of the other elements. The additional connection of the power converter device by way of the two contactors or by way of the battery contactor makes possible an especially flexible operation of the on-board network. For example, all electrical power sub-networks can be electrically decoupled from, or, at the same time, electrically connected to the energy storage system by means of the contactors.

It may also be provided, for example, that the charging device is initially electrically decoupled from the energy storage system and a drive operation of the motor vehicle is realized by means of the traction engine. When a charging station is approached, the charging device, in addition to the traction engine, is then connected to the energy storage system. After the motor vehicle has been parked for charging of the energy storage system at the charging station, the electrical connection of the energy storage system to the charging device is retained, but the electrical connection to the traction engine is severed.

In the scope of another embodiment of the invention, it is provided that the first contactor and the second contactor are each connected to the energy storage system by way of the battery contactor. In an embodiment of this kind, therefore, the battery contactor is designed, so to speak, as a main contactor. The power converter device, the first contactor, and the second contactor are each connected to the energy storage system via the battery contactor, so that, when the battery contactor is opened, the two electrical power sub-networks and the power converter device are electrically disconnected from the energy storage system.

When the battery contactor is closed—in the case that the first contactor and the second contactor are opened—the power converter device is electrically connected to the energy storage system, whereas the two electrical power sub-networks are electrically disconnected from it. Only through additional closing of the first contactor or of the second contactor can the respective electrical power sub-network be electrically connected to the energy storage system. In this way, an especially modular operation of the on-board network can be implemented.

An enhancement of the invention provides that the first contactor and the second contactor are arranged in a common distributor housing of a battery distributor, with a first switch connector of the battery distributor being connected by way of the first contactor and a second switch connector of the battery distributor being connected by way of the second contactor to the energy storage system, and with the first electrical power sub-network being connected to the first switch connector and the second electrical power sub-network being connected to the second switch connector. The battery distributor represents a so-called battery junction box (BJB).

At the battery distributor, on the one hand, the energy storage system is electrically connected and, on the other hand, the two electrical power sub-networks as well as— optionally—the low-voltage electrical power network are electrically connected. The battery distributor is equipped with the distributor housing, in which the relevant contactors, that is, at least the first contactor and the second contactor, are arranged. Optionally, the battery contactor can also be present in the distributor housing. Arranged at the distributor housing are the first switch connector and the second switch connector. For example, both switch connectors are present as plug-in connectors. By way of the switch connectors, the two electrical power sub-networks are electrically connected to the respective contactor. A configuration of this kind enables a very compact embodiment to be implemented. In addition, all essential and permanently current-carrying components are arranged in the distributor housing, so that, in addition, a better safety is ensured.

Finally, in the scope of another embodiment of the invention, it can be provided that the power converter device is arranged in the distributor housing, with a power converter connector of the battery distributor being connected to the energy storage system by way of the power converter device. It has already been mentioned above that the power converter device is usually to be electrically connected to the energy storage system when only one of two contactors is already closed. For this reason, the power converter device is also included in the frequently current-carrying components and is therefore accommodated in the distributor housing.

The power converter connector, to which the power converter device is connected, is preferably present at the distributor housing and can be designed as a plug-in connector in analogy to the switch connectors. By way of the power converter connector, the low-voltage electrical power network is preferably electrically connected to the power converter device. Based on the increased degree of integration of the battery distributor, the space requirement is further reduced.

The invention further relates to a method for operating an on-board network for a motor vehicle, in particular an on-board network in accordance with the discussions in the scope of this description, wherein the on-board network is equipped with at least one energy storage system for the intermediate storage of electrical energy and an electrical power network, which has at least one energy-consuming device that can be operated with electrical energy from the energy storage system and at least one charging device for charging the energy storage system, wherein the energy storage system is electrically connected to the electrical power network via at least one contactor.

In this case, it is provided that the energy-consuming device is present in a first electrical power sub-network of the electrical power network and the charging device is present in a second electrical power sub-network of the electrical power network, wherein the first electrical power sub-network is connected to the energy storage, in a manner that is electrically separate from the second electrical power sub-network, by way of the contactor present as the first contactor, and the second electrical power sub-network is connected to the energy storage, in a manner that is electrically separated from the first electrical power sub-network, by way of a second contactor, wherein, from a plurality of kinds of operations, one kind of operation is chosen and, in accordance with the kind of operation, the first contactor and the second contactor are each opened or closed.

Reference has already been made to such an embodiment of the on-board network or to a procedural approach of this kind. Both the on-board network and the method for the operation thereof can be further developed in accordance with the discussions in the scope of this description, so that in this regard, reference is made to said discussions.

The method provides that, first of all, from a plurality of kinds of operation, one kind of operation is chosen. Each of the kinds of operation specifies which contactor or contactors are to be opened or closed. After selection of the kind of operation, the two contactors are accordingly actuated in accordance with this information.

A preferred embodiment of the invention provides that, in a disconnecting kind of operation, the first contactor and the second contactor are opened. In the disconnecting kind of operation, the first electrical power sub-network and the second electrical power sub-network are to be electrically disconnected from the energy storage system. Accordingly, the first contactor and the second contactor are opened or kept open. Through the complete disconnection of the two electrical power sub-networks from the energy storage system, a high degree of safety is ensured.

Another especially preferred embodiment of the invention provides that, in a first kind of operation, the first contactor is closed and the second contactor is opened and/or, in a second kind of operation, the first contactor is opened and the second contactor is closed. Accordingly, in the first kind of operation, the first electrical power sub-network is to be electrically connected to the energy storage system and the second electrical power sub-network is to be electrically disconnected from it.

Conversely, in the second kind of operation, the first electrical power sub-network is to be electrically disconnected from the energy storage system and the second electrical power sub-network is be electrically connected to it. Accordingly, the contactors are opened or closed or kept open or closed. A procedural course of this kind makes it possible to reduce electrical losses, because, at all times, the electrical power sub-network electrically connected to the energy storage system is only the one that is required for operation of the respective electrical component, that is, for operation of the energy-consuming device or of the charging device.

BRIEF DESCRIPTION OF THE DRAWING

The invention will be explained in detail below on the basis of the exemplary embodiment illustrated in the drawing, without any limitation of the invention thereby occurring. In this case, the sole FIGURE shows:

FIGURE: a schematic illustration of a region of an on-board network for a motor vehicle.

DETAILED DESCRIPTION

The FIGURE shows a schematic illustration of an on-board network 1 for a motor vehicle, which is equipped with an energy storage system 2 as well as an electrical power network 3. In the electrical power network 3, there is at least one energy-consuming device 4 (in the exemplary embodiment illustrated here, there are a plurality of energy-consuming devices 4) as well as a charging device 5. The energy-consuming device 4 can fundamentally be designed in any way. For example, one of the energy-consuming devices 4 is present in the form of an electric machine, namely, a traction engine for a motor vehicle. Another one of the energy-consuming devices 4 can be designed, for example, as an electrically operated air conditioner compressor or as an electric heating element for an interior compartment heating of the motor vehicle, for example.

The at least one energy-consuming device 4 can be operated by means of electrical energy taken from the energy storage system 2. The charging device 5, in contrast, serves for charging the energy storage system 2 with electrical energy. The electrical energy for charging the energy storage system 2 is supplied, for example, by means of an external device that is not illustrated here, namely, an energy supply device, and is electrically connected to the charging device 5.

It is provided that the energy-consuming device 4 or the energy-consuming devices 4 are present in a first electrical power sub-network 6 or are connected to it, whereas the charging device 5 is present in a second electrical power sub-network 7 or is connected to it. The first electrical power sub-network 6 can be electrically connected to the energy storage system 2 by way of a first contactor 8, and the second electrical power sub-network 7 can be electrically connected to the energy storage system 2 by way of a second contactor 9.

The two contactors 8 and 9 are arranged in a common distributor housing 10 of a battery distributor 11. The battery distributor 11 has a first switch connector 12 and a second switch connector 13. The first electrical power sub-network 6 is connected via the first switch connector 12 and the second switching electrical power network* 7 is connected via the second switch connector 13 to the battery distributor 11. In this case, the first electrical power sub-network 6 is in electrical connection with the first contactor 8 by way of the first switch connector 12, and the second electrical power sub-network 7 is in electrical connection with the second contactor 9 by way of the second switch connector, preferably permanently. On the side facing away from the electrical power sub-networks 6 and 7, the contactors 8 and 9 are electrically connected to the energy storage system 2, preferably permanently.

In addition, the battery distributor 11 can have a power converter connector 14, by way of which a low-voltage electrical power network is electrically connected to the battery distributor 11. Preferably, the low-voltage electrical power network is connected by way of the power converter connector 14 to a power converter device, which is not illustrated here and which is electrically connected to the energy storage system 2. The power converter device is preferably designed as a voltage converter and therefore serves for converting an energy voltage supplied by the energy storage system 2 to a voltage that is different from the battery voltage.

The on-board network 1 described here makes possible an extremely flexible operation and, in addition, a high safety, because, on the one hand, electrical losses are prevented by the specific connection of the electrical power sub-networks 6 and 7 to the energy storage system 2 and, on the other hand, components of the on-board network 1 that are not required are electrically disconnected from the energy storage system 2.

The invention claimed is:

1. An on-board network for a motor vehicle, comprising: at least one energy storage system for the intermediate storage of electrical energy and an electrical power network that has at least one energy-consuming device that can be operated with electrical energy from the energy storage system and at least one charging device for charging the energy storage system, wherein the energy storage system is electrically connected to the electrical power network, wherein the energy-consuming device is present in a first electrical power sub-network of the electrical power network and the charging device is present in a second electrical power sub-network of the electrical power network, wherein the first electrical power sub-network is connected to the energy storage system in a manner that is electrically separated from the second electrical power sub-network by way of a first contactor, and the second electrical power sub-network is connected to the energy storage system, in a manner that is electrically separated from the first electrical power sub-network by way of a second contactor, wherein the first contactor and the second contactor are arranged in a common distributor housing of a battery distributor, wherein a first switch connector of the battery distributor is connected by way of the first contactor and a second switch connector of the battery distributor is connected by way of the second contactor to the energy storage system, and wherein the first electrical power sub-network is connected to the first switch connector and the second electrical power sub-network is connected to the second switch connector.

2. The on-board network according to claim 1, wherein the at least one energy-consuming device is present as one or more of a traction engine for the motor vehicle, an inverter, an electrically operable air conditioner compressor, or an electric heating element of an interior compartment heating.

3. The on-board network according to claim 1, wherein the charging device is connected to a charging connector or to an energy transfer device for cable-free energy transfer.

4. The on-board network according to claim 1, wherein a power converter device is connected by way of both the first contactor and the second contactor to the energy storage system, or the power converter device is connected to the energy storage system by way of a battery contactor.

5. The on-board network according to claim 4, wherein the first contactor and the second contactor are each connected to the energy storage system via the battery contactor.

6. The on-board network according to claim 1, wherein the power converter device is arranged in the distributor housing, wherein a power converter connector of the battery distributor is connected to the energy storage system via the power converter device.

7. A method for operating an on-board network for a motor vehicle, comprising:
the on-board network makes available at least one energy storage system for the intermediate storage of electrical energy and an electrical power network that has at least one energy-consuming device that can be operated with electrical energy from the energy storage system and at least one charging device for charging the energy storage system, wherein the energy storage system is electrically connected to the electrical power network by way of at least one contactor, wherein the energy-consuming device is present in a first electrical power sub-network of the electrical power network and the charging device is present in a second electrical power sub-network of the electrical power network, wherein the first electrical power sub-network is connected to the energy storage system in a manner that is electrically separated from the second electrical power sub-network by way of a first contactor, and the second electrical power sub-network is connected to the energy storage system in a manner that is electrically separated from the first electrical power sub-network by way of a second contactor, wherein, from a plurality of operations, one operation is chosen and, in accordance with the chosen operation, the first contactor and the second contactor are each opened or closed, wherein the first contactor and the second contactor are arranged in a common distributor housing of a battery distributor, wherein a first switch connector of the battery distributor is connected by way of the first contactor and a second switch connector of the battery distributor is connected by way of the second contactor to the energy storage system, and wherein the first electrical power sub-network is connected to the first switch connector and the second electrical power sub-network is connected to the second switch connector.

8. The method according to claim 7, wherein, in a disconnecting operation, the first contactor and the second contactor are opened.

9. The method according to claim 7, wherein, in a first operation, the first contactor is closed and the second contactor is opened and/or, in a second operation, the first contactor is opened and the second contactor is closed.

* * * * *